(12) United States Patent
Yan et al.

(10) Patent No.: US 7,335,712 B2
(45) Date of Patent: Feb. 26, 2008

(54) PROCESS OF PRODUCING A SILOXY-FUNCTIONALIZED POLYMER

(75) Inventors: Yuan-Yong Yan, Copley, OH (US); David F. Lawson, Uniontown, OH (US); Christine M. Rademacher, Akron, OH (US)

(73) Assignee: Bridgestone Corporation, Chuo-ku, Tokyo (JP)

( * ) Notice: Subject to any disclaimer, the term of this patent is extended or adjusted under 35 U.S.C. 154(b) by 158 days.

(21) Appl. No.: 11/111,615

(22) Filed: Apr. 21, 2005

(65) Prior Publication Data

US 2006/0241241 A1 Oct. 26, 2006

(51) Int. Cl.
*C08F 4/44* (2006.01)

(52) U.S. Cl. ............ 526/178; 526/335; 526/346; 526/347; 526/347.1

(58) Field of Classification Search ............ None
See application file for complete search history.

(56) References Cited

U.S. PATENT DOCUMENTS

| | | | |
|---|---|---|---|
| 5,268,439 A | 12/1993 | Hergenrother et al. | |
| 5,321,148 A | 6/1994 | Schwindeman | |
| 5,376,745 A * | 12/1994 | Handlin et al. | 526/178 |
| 5,496,940 A | 3/1996 | Lawson et al. | |
| 5,563,275 A * | 10/1996 | Gentry et al. | 526/194 |
| 5,574,109 A | 11/1996 | Lawson et al. | |
| 5,605,991 A * | 2/1997 | Chamberlain et al. | 526/178 |
| 5,665,829 A * | 9/1997 | Shepherd et al. | 525/332.3 |
| 5,786,441 A | 7/1998 | Lawson et al. | |
| 5,786,448 A | 7/1998 | Nefzi et al. | |
| 5,932,662 A | 8/1999 | Lawson et al. | |
| 6,025,450 A | 2/2000 | Lawson et al. | |
| 6,046,288 A | 4/2000 | Lawson et al. | |
| 6,080,853 A | 6/2000 | Corrigan et al. | |
| 6,197,891 B1 | 3/2001 | Schwindeman et al. | |
| 2001/0018397 A1 * | 8/2001 | Zundel et al. | 502/125 |

OTHER PUBLICATIONS

"Regiospecific Synthesis of Alpha-Lithiated Alkoxysilanes" authored by Thomas et al. and published in J. Organomet. Chem. (2000) 595, 87-92.*
Abstract for KR 2003/000406.*

* cited by examiner

*Primary Examiner*—Marc S. Zimmer
(74) *Attorney, Agent, or Firm*—Arthur M. Reginelli; Meredith E. Hooker

(57) ABSTRACT

This invention relates to siloxy-functionalized polymers having the silicon of the siloxy group directly bonded to the end of a polymer chain through one or more carbon atoms, processes of producing the polymers, and initiators used to prepare the polymers. The polymers may be rubbery polymers, such as butadiene-styrene polymers, which are commonly used in tires.

23 Claims, No Drawings

PROCESS OF PRODUCING A SILOXY-FUNCTIONALIZED POLYMER

FIELD OF THE INVENTION

This invention relates to siloxy-functionalized polymers.

BACKGROUND OF THE INVENTION

It is well known in the art that various initiators may be used when preparing polymers. It is also known that certain functional groups may be incorporated into the polymer by using initiators that contain the desired functional groups.

The present invention stems from a recognition that a siloxy-functional polymer has significant beneficial properties. For instance, it has been found that having a siloxy-functionalized group within the polymer portion of the rubber results in a compounded rubber composition having improved properties. Products produced from compounded rubber compositions such as tires and power belts exhibit increased rebound, decreased rolling resistance, and less heat build-up when mechanical stresses are applied. The siloxy functionality in the polymer improves the interaction of the polymer with additional components, such as carbon black and silica fillers. This improved interaction often translates into improved mixing and better dispersion of ingredients.

BRIEF SUMMARY OF THE INVENTION

The present invention therefore provides a siloxy-functional polymer having the silicon of the siloxy group directly bonded to the end of the polymer chain so that the entire siloxy functionality may be incorporated into the polymer.

In one embodiment, the invention relates to a process for producing a siloxy-functionalized polymer having the silicon of the siloxy group directly bonded to the end of a polymer chain through one or more carbon atoms, comprising the steps of: (a) providing a siloxy-containing compound; (b) metallating the siloxy-containing compound to produce a metallated siloxy-containing compound; and (c) polymerizing an anionically polymerizable monomer in the presence of the metallated siloxy-containing compound, to produce the siloxy-functionalized polymer having the silicon of the siloxy group directly bonded to the end of the polymer chain through one or more carbon atoms.

The invention further relates to a siloxy-functionalized polymer having the silicon of the siloxy group directly bonded to the end of the polymer chain through one or more carbon atoms.

The invention further relates to a compounded rubber composition comprising (a) a siloxy-functionalized polymer having the silicon of the siloxy group directly bonded to the end of the polymer chain through one or more carbon atoms; (b) at least one filler; and (c) at least one compounding ingredient.

The invention further relates to a tire comprising least one component selected from the group consisting of a tread, a subtread, a black sidewall, a body ply skim, and a bead filler, and wherein the component comprises (a) a siloxy-functionalized polymer having the silicon of the siloxy group directly bonded to the end of the polymer chain through one or more carbon atoms; (b) at least one filler; and (c) at least one compounding ingredient.

The invention further relates to a method of using a siloxy-containing compound as an initiator to prepare a polymer, wherein the siloxy-containing compound is represented by Formula I

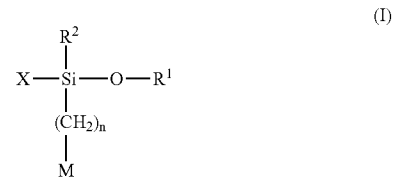

wherein M represents a metal; n represents an integer ranging from 1-3; X represents a hydrocarbon that contains no α-protons in the carbon atom bonded to the silicon atom; $R^1$ represents an alkyl group; and $R^2$ represents an alkyl group or alkoxy group, wherein $R^1$ and $R^2$ may together form a cyclic structure.

DETAILED DESCRIPTION OF THE INVENTION

This invention relates to a process for producing a siloxy-functionalized polymer having the silicon of the siloxy group directly bonded to the end of a polymer chain through one or more carbon atoms, comprising the steps of: (a) providing a siloxy-containing compound; (b) metallating the siloxy-containing compound to produce a metallated siloxy-containing compound; and (c) polymerizing an anionically polymerizable monomer in the presence of the metallated siloxy-containing compound, to produce the siloxy-functionalized polymer having the silicon of the siloxy group directly bonded to the end of the polymer chain through one or more carbon atoms.

Directly bonding the silicon atom of the siloxy group to the end of the polymer chain through one or more carbon atoms is defined such that only carbon atoms are present in the bond between the silicon atom and the end of the polymer chain. The silicon-polymer bond may thus be represented as Si—C-polymer, Si—C—C-polymer, Si—C—C—C-polymer, or derivatives thereof. Other elements, such as oxygen, may not be present in the bond between the silicon and the polymer. On the other hand, other substituents may be attached to the silicon and carbon atoms in the bond, provided that a direct bond from the silicon to the end of the polymer chain involving only carbon atoms is still present.

Directly bonding the silicon to the end of the polymer chain through one or more carbon atoms allows the attachment of the silicon to the polymer to occur through silicon-carbon and carbon-carbon bonds, both of which are relatively strong. If the silicon is bonded to the polymer through a different element, e.g. oxygen, then a silicon-oxygen-carbon bond is created. The silicon-oxygen-carbon bond, however, is susceptible to attack by water and other —OH containing compounds, such as alcohols and hydroxy-containing fillers, through a hydrolysis reaction. During a hydrolysis reaction, the —OH containing compound reacts with the silicon atom and cleaves the silicon-oxygen bond that connects the silicon to the polymer, having the undesirable effect of removing the silicon functionality from the polymer.

If, however, the silicon atom is directly bonded to the polymer through one or more carbon atoms, hydrolysis will not affect the bond between the silicon and the polymer. Rather, a hydrolysis reaction will cleave the silicon-oxygen bond between the silicon atom and the alkoxy substituent, leaving the silicon atom bonded to the polymer post hydrolysis. When a filler such as silica initiates the hydrolysis reaction, additional benefits may also be seen. The oxygen of the silica bonds to the silicon of the initiator (the siloxy-functional compound), which, in turn, is attached to the polymer. Thus, reaction of the silica filler with the initiator allows the polymer to be connected to the filler, improving the filler-polymer interaction.

The siloxy-containing compound may be any compound that contains a siloxy group (Si—O—R) as a functional group in the compound. Preferably the siloxy-containing compound is an alkoxysilane or a dialkoxysilane.

Aside from the siloxy group, the siloxy-containing compound may contain various other substituents, e.g., an alkyl group. These substituents should be attached to the silicon in a manner that allows for the entire siloxy functional group to be directly bonded to the end of a polymer chain, through one or more polymer chains, when the siloxy-containing compound is used as an initiator in a polymerization process. The siloxy-containing compound preferably contains at least one alkyl, more preferably, the alkyl group has 1-3 carbon atoms. From a kinetic standpoint, methyl is a most preferred alkyl group. Ethyl and propyl are also examples of preferred alkyl groups.

In one particular embodiment, siloxy-containing compound may contain up to three alkyl groups. In another embodiment, the siloxy-containing compound contains at least one hydrocarbon substituent that contains no α-protons on the carbon atom directly bonded to the silicon atom. A hydrocarbon substituent that contains no α-protons on the carbon atom directly bonded to the silicon atom means that the carbon atom bonded to the silicon atom is also bonded to three non-hydrogen moieties. Suitable hydrocarbon substituents include a t-butyl group, a phenyl group, or derivatives thereof. Other hydrocarbon substituents having no α-protons on the bonding carbon atom may also be used.

Therefore, a preferred aspect of the invention relates to a siloxy-containing compound that contains (a) at least one hydrocarbon substituent that contains no α-protons in the carbon atom bonded to the silicon atom, and (b) at least one alkyl group. A more preferred aspect of the invention relates to a siloxy-containing compound that contains (a) a t-butyl group or phenyl group, and (b) two methyl groups. Particularly preferred siloxy-containing compounds include t-butyldimethyl-propoxy-silane, dimethyl-phenyl-propoxy-silane, and 2-t-butyl-2,5,5-trimethyl-1,3,2-dioxasilinane.

The siloxy-containing compound is metallated to produce a metallated siloxy-containing compound. Metallation, as is well-known in the art, involves a process where a proton of an organic compound is replaced with a metal. The metal is typically derived from an organometallic compound, such as butyl lithium. In this case, the organic compound undergoing the metallation reaction is the alkyl substituent attached to the silicon of the siloxy-containing compound, where a hydrogen in the alkyl group is replaced with a metal.

Any suitable metal may be used in the metallation step, including lithium, zinc, magnesium, potassium, and sodium. Preferably, the metallation step involves lithiating the siloxy-containing compound.

An anionically polymerizable monomer is then polymerized in the presence of the metallated siloxy-containing compound under typical polymerization conditions, as discussed below. The polymerization process involves at least one anionically polymerizable monomer and optionally an additional monomer.

All known anionically polymerizable monomers may be used, although monomers that are conjugated dienes are preferred. Suitable monomers include conjugated dienes having from about 4 to about 12 carbon atoms. Preferred conjugated dienes include 1,3-butadiene, isoprene, 1,3-pentadiene, 2,3-dimethyl-1,3-butadiene, and myrcene. Most preferably, the monomer is a butadiene.

As is known in the art, the polymerization process may take place in the presence of one or more additional monomers. Suitable monomers include monovinyl aromatic monomers containing 8 to 18 carbon atoms, such as styrene, α-methyl styrene, p-methylstyrene, and vinylnaphthalene. Preferably, the additional monomer is styrene.

When butadiene and styrene are used in the polymerization process, a butadiene-styrene polymer will be formed. The butadiene-styrene polymer is a rubbery polymer that is commonly used in the industry for various components that utilize rubber. Butadiene-styrene polymers and other rubbery polymer represent the preferred polymers.

The polymerization is preferably carried out in an organic solvent as the diluent. Accordingly, a solution polymerization system may be employed in which both the monomer to be polymerized and the polymer formed are soluble in the polymerization medium. The amount of organic solvent in addition to the amount of organic solvent that may be used in preparing the catalyst composition is usually added to the polymerization system. The additional organic solvent may be the same as or different from the organic solvent used in preparing the catalyst composition.

Useful solvents include polar and non-polar hydrocarbon solvents such as aromatic hydrocarbons, aliphatic hydrocarbons, and cycloaliphatic hydrocarbons. Suitable aromatic hydrocarbon solvents include benzene, toluene, xylenes, ethylbenzene, diethylbenzene, mesitylene, and the like. Suitable aliphatic hydrocarbon solvents include pentanes, hexanes, heptanes, octanes, nonanes, decanes, isohexanes, isopentanes, isooctanes, 2,2-dimethylbutane, petroleum ether, kerosene, petroleum spirits, mineral spirits, and the like. Suitable cycloaliphatic hydrocarbon solvents include cyclopentane, cyclohexane, methylcyclopentane, methylcyclohexane, and the like. Commercial mixtures of the above hydrocarbons may also be used. Preferably, the solvent is tetrahydrofuran (THF), a cyclic or acyclic hexane, a heptane, an octane, a pentane, their alkylated derivatives, or mixtures thereof.

When a solvent is employed, the concentration of the conjugated diene monomer to be polymerized is not limited to a special range. However, when 1,3-butadiene is used as the conjugated diene monomer, the concentration of the 1,3-butadiene monomer present in the polymerization medium at the beginning of the polymerization preferably ranges from about 2% to about 20% by weight, more preferably from about 5% to about 18% by weight, and even more preferably from about 10% to about 15% by weight.

The polymerization of conjugated diene monomers may be carried out as a batch process, a continuous process, or a semi-batch process. In the semi-batch process, monomer is intermittently charged as needed to replace the monomer as it is consumed. The polymerization is preferably conducted under anaerobic conditions by using an inert protective gas such as nitrogen, argon or helium, with moderate to vigorous agitation. The polymerization temperature may vary widely from a low temperature, such as −10° C. or below, to a high temperature of 100° C., with a preferred temperatures ranging from about 20° C. to about 90° C. The heat from the polymerization process may be removed by external cooling, cooling by evaporation of the monomer or the solvent, or a combination of the two methods. Although the polymerization pressure employed may vary widely, a preferred pressure range is from about 1 atmosphere to about 10 atmospheres.

Once a desired conversion is achieved, the polymerization can be stopped by adding a polymerization terminating reagent. Protic terminating reagents include but are not limited to, an alcohol, a carboxylic acid, an inorganic acid, water, or a mixture thereof. Functional terminating reagents include active hydrogen compounds such as water or alcohol; carbon dioxide; N,N,N',N'-tetradialkyldiamino-benzophenone (such as tetramethyldiaminobenzophenone or the like); N,N-dialkylaminobenzaldehyde (such as dimethylaminobenzaldehyde or the like); 1,3-dialkyl-2-imidazolidinones (such as 1,3-dimethyl-2-imidazolidinone or the like); 1-alkyl substituted pyrrolidinones; and 1-aryl substituted pyrrolidinones; dialkyl-and dicycloalkyl-carbodiimides having from about 5 to about 20 carbon atoms. Additional terminating reagents are described in U.S. Pat. No. 5,932,662, hereby incorporated by reference in its entirety.

An antioxidant such as 2,6-di-tert-butyl-4-methylphenol may be added along with, before, or after the addition of the terminating reagent. Preferably, the antioxidant is added after the terminating reagent, especially when one of the above-listed terminating reagents is utilized. The amount of the antioxidant employed is usually in the range of 0.2% to 1% by weight of the polymer product. When the polymerization has been stopped, the polymer can be recovered from the polymerization mixture by utilizing conventional procedures of desolventization and drying. For instance, the polymer may be isolated from the solution by coagulation of the polymerization mixture with an alcohol such as methanol, ethanol, or isopropanol, followed by isolation, or by steam distillation of the solvent and the unreacted monomer, followed by isolation. The isolated polymer is then dried to remove residual amounts of solvent and water. Alternatively, the polymer may be isolated from the polymerization mixture by directly drum drying the polymerization cement.

In order to promote randomization in copolymerization and to control vinyl content, a polar coordinator may be added. Compounds useful as polar coordinators are organic and include tetrahydrofuran (THF), linear and cyclic oligomeric oxolanyl alkanes such as 2,2-bis(2'-tetrahydrofuryl) propane, di-piperidyl ethane, dipiperidyl methane, hexamethylphosphoramide, N-N'-dimethylpiperazine, diazabicyclooctane, dimethyl ether, diethyl ether, tributylamine and the like. Linear and cyclic oligomeric oxolanyl alkane modifiers are described in U.S. Pat. No. 4,429,091, herein incorporated by reference in its entirety.

The invention also relates to a siloxy-functionalized polymer having the silicon of the siloxy group directly bonded to the end of the polymer chain through one or more carbon atoms. The polymer may be prepared as described above, preferably with a metallated siloxy-containing compound, more preferably a lithiated siloxy-containing compound, used as an initiator.

The polymer containing the siloxy-functional group may be any polymer known in the art. Preferably, the polymer is a rubbery polymer, and more preferably, the polymer is a butadiene-styrene polymer.

The invention also relates to a compounded rubber composition. The compounded rubber composition contains a siloxy-functionalized polymer having the silicon of the siloxy group directly bonded to the end of the polymer chain through one or more carbon atoms, at least one filler, and at least one compounding ingredient.

The filler and the compounding ingredients include any fillers and compounding ingredients known to those of skill in the art. Preferably, the filler is silica, alumina, carbon black, or mixtures thereof. Typical compounding ingredients include conventional additives, such as plasticizers, antiozonants, curing agents, stearic acid, LVA oil, zinc oxide, sulfur, accelerators, PVI, and shielding agents. Standard rubber mixing equipment and procedures may be used when adding the compounding ingredients.

The compounded rubber composition may be prepared by compounding the siloxy-functional polymer with the filler and compounding ingredients. When compounded, the rubber composition exhibits reduced hysteresis, which translates into products having increased rebound, decreased rolling resistance and less heat build-up when subjected to mechanical stress.

This invention also relates to a tire which comprises at least one component selected from the group consisting of a tread, a subtread, a black sidewall, a body ply skim, bead filler, and combinations thereof. Preferably, the component comprises a siloxy-functionalized polymer having the silicon of the siloxy group directly bonded to the end of the polymer chain through one or more carbon atoms, at least one filler, at least one compounding ingredient. As set forth above, the compounded rubber composition contains the polymer, fillers, and compounding ingredients. When preparing tire compositions, the compounded rubber composition is combined with one or more of the additional components listed above through methods known in the art. Besides tires, the compounded rubber compositions may also be combined with the additional components to form tire treadstock, sidewall stock, power belts and similar products.

This invention also relates to a method of using a siloxy-containing compound as an initiator to prepare a polymer, wherein the siloxy-containing compound is represented by Formula I

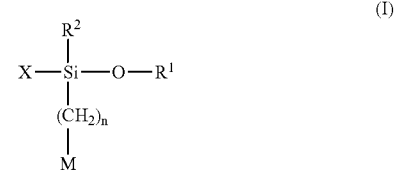

wherein M represents a metal; n represents an integer ranging from 1-3; X represents a hydrocarbon that contains no α-protons on the carbon atom bonded to the silicon atom; $R^1$ represents an alkyl group; and $R^2$ represents an alkyl group or alkoxy group, wherein $R^1$ and $R^2$ may together form a cyclic structure.

Suitable metals include lithium, zinc, magnesium, potassium, and sodium. Suitable alkyl groups include linear and branched-chain alkyl groups having 1-12 carbon atoms, preferably 1-6 carbon atoms. Suitable alkoxy groups include alkoxy groups with alkyl groups having 1-12 carbon atoms, preferably 1-6 carbon atoms. When $R^1$ and $R^2$ together form a cyclic structure, the cyclic structure may form, together with the silicon atom, a dialkoxy group, such as a 1,3,2-dioxasilinane, or derivative thereof. Most preferably, M represents a lithium atom; n represents 1; $R^2$ represents a methyl group; and X represents a t-butyl group, a phenyl group, or derivative thereof.

The use of initiators in preparing polymers is well known in the art. These initiators may be used to prepare all types of polymers, including rubbery polymers, such as butadiene-styrene polymers. When preparing a polymer, the above-described initiator may be used by itself or in combination with other initiators known in the art including trialkyl-tin initiators, such as those described in U.S. Pat. No. 5,268,439, herein incorporated by reference in its entirety, and cyclic-amine initiators, such as those described in U.S. Pat. Nos. 6,080,853; 5,786,448; 6,025,450; and 6,046,288, all of which are herein incorporated by reference in their entirety.

The practice of the invention is further illustrated by the following examples, which should not be construed as limited the scope of the invention as recited in the claims.

EXAMPLES

Materials:

A dried 28-oz or 7-oz glass bottle, which previously had been sealed with extracted septum liners and perforated crown caps under a positive nitrogen purge, was used for all of the preparations. Butadiene in hexane (21.6 weight percent butadiene), styrene in hexane (33 weight percent styrene), hexane, modifier (1.6 M solution in hexane), and BHT solution (antioxidant) in hexane were used as supplied after dilution. Commercially available reagents and starting materials include the following: 1-propanol (99.5%, Aldrich), sodium hydride (60% dispersion in mineral oil, Aldrich), sec-butyllithium (1.4M in cyclohexane, Aldrich), t-butyldimethylchlorosilane (Gelest, Inc.), which were used as purchased without further purification. Tetrahydrofuran (THF) was distilled under nitrogen from potassium/benzophenone ketyl. $^1$HNMR, $^{13}$C NMR spectra were recorded on a Varian 300 MHz spectrometers in $CDCl_3$.

Example No. 1 t-butyldimethyl-n-propoxysilane

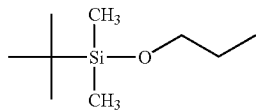

To a dry-ice cooled suspension of 4.0 g of sodium hydride (60% dispersion in mineral oil) in 80 ml of anhydrous THF was dropwise added a solution of 7.44 ml of 1-propanol in 30 ml of the same solvent, and the mixture was slowly warmed to room temperature with continued stirring for 1 hr under nitrogen. A solution of 15.0 g of t-butyldimethylchlorosilane in 40 ml of THF was slowly added by syringe and continued stirring for 3 hr at room temperature. After distillation of the solvent, house vacuum distillation afforded the pure t-butyldimethyl-n-propoxysilane as a colorless liquid (106° C./house vacuum, 12.0 g, 69.2%). $^1$HNMR ($CDCl_3$): δ 0.05 (s, 6H), 0.88 (t, J=7.5Hz, 3H), 0.89 (s, 9H), 1.53 (sextet, 2H), 3.56 (t, J=6.6 Hz, 2H). $^{13}$C-NMR ($CDCl_3$): δ−5.08 (2C), 10.47 (1C), 18.58 (1C), 26.17 (3C), 26.21 (1C), 65.13 (1 C).

Example 2 t-butylmethyl-n-propoxy-silylmethyllithium ($BuMePrOSiCH_2Li$)

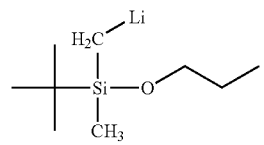

To an oven dried 7-oz glass bottle was introduced 1 ml of t-butyldimethyl-n-propoxysilane (0.88 g, 5.04 mmol), 5 ml of triethylamine, and 3.6 ml of sec-BuLi (1.4 M in cyclohexane, 5.04 mmol). The reaction mixture was agitated at 50° C. water bath for 3 hr. The resulting t-butyl-methyl-n-propoxy-silylmethyllithium ($BuMePrOSiCH2Li$, 0.52 M) was used as anionic initiator for polymerizing of butadiene and/or butadiene/styrene and stored cold in an inert atmosphere of nitrogen.

Example 3 t-butyl-methyl-trimethylsilanemethyl-n-propoxysilane

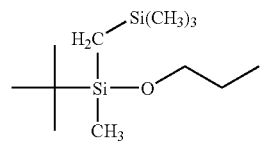

To 7 ml of $BuMePrOSiCH_2Li$ (0.52 M) was dropwise added 3.7 ml of chlorotrimethyl-silane (1.0 M solution in tetrahydrofuran) at −78° C., and the mixture was slowly warmed to room temperature with continued stirring for 1 hr under nitrogen. The reaction mixture was filtered through silica gel then a PrepSep Florisil Tube. Removal of the solvent yielded 0.80 g (90%) of t-butyl-methyl-trimethylsilanemethyl-n-propoxy-silane as a colorless oil. $^1$HNMR ($CDCl_3$): δ −0.23 (dd, J=13.8, 81 Hz, 2H), 0.05 (s, 9H), 0.08 (s, 3H), 0.88 (s, 9H), 0.89 (t, J=7.5 Hz, 3H), 1.53 (m, 2H), 3.57 (t, J=6.6 Hz, 2H). $^{13}$C-NMR ($CDCl_3$): δ −4.74, (1C), −0.15 (1C), 1.66 (3C), 10.75 (1C), 19.81(1C), 26.45 (1C), 26.61(3C), 65.68 (1C).

Example 3 is a characterization experiment that confirms the location of the lithium. Since the $Si(CH_3)_3$ bonds to the lithiated carbon atom, this example confirms that the lithium was indeed attached to the siloxy-containing compound via the methyl group.

Example 4-6

Bottle Polymerization

Example 4: In a 0.8 L bottle was charged 161.1 g of hexane, and 138.9 g of butadiene blend (21.6 wt %), then 1.30 ml of $BuMePrOSiCH_2Li$ (0.52 M) was added by syringe. The bottle was agitated and heated at 50° C. for 1.5 hr. The polymer cement was terminated with a small amount of 2-propanol, treated with 5 ml of BHT solution, coagulated with 2-propanol, and dried under vacuum for 12 hr.

The preparation and the procedure used Example 4 was repeated in Examples 5 and 6, except that 0.80 ml and 0.60 ml of BuMePrOSiCH$_2$Li was used, respectively.

The GPC and NMR results of the polymers of Examples 4-6 are listed in Table 1. The results confirm that the silicon-lithium reagent is viable as an initiator.

TABLE 1

GPC and NMR results of PBds

| Example | Target M$_n$ | M$_n$ (g/mol) | M$_p$ (g/mol) | PDI | % 1,2-Bd | T$_g$ (° C.) |
|---|---|---|---|---|---|---|
| 4 | 50k | 52138 | 69027 | 1.14 | 11.7 | −89.8 |
| 5 | 80k | 84676 | 112905 | 1.16 | 10.4 | −90.3 |
| 6 | 100k | 104357 | 132225 | 1.12 | 9.6 | −91.4 |

Examples 7-8

Batch Polymerization

Example 7: Into a two gallon (7.6 L) N$_2$ purged reactor, equipped with a stirrer, was added 1.6 kg of hexane, 0.41 kg of 33 wt % styrene in hexane, and 2.5 kg of 22.2 wt % butadiene in hexane. The reactor was charged with 23.5 mL of 0.68 M of BuMePrOSiCH$_2$Li (prepared by the same procedures as used in Example 2), and 1.05 mL of cyclic oligomeric oxolanyl alkane modifier (1.6 M in hexane) and then heated to 24° C. The reactor jacket was then heated to 50° C. After 150 minutes, the batch temperature peaked at 53° C. After an additional 15 minutes, samples of the cement were removed from the reactor into dried 28-oz (0.8 L) glass bottles, and terminated with 2-propanol (abbreviated as X-SBR-H) at 50° C. bath for 30 minutes, coagulated in isopropanol containing butylated hydroxy toluene (BHT), and drum dried.

The preparation and procedure used in Example 7 was used in Example 8, except that 1,3-dimethyl-2-imidazolidinone (DMI, 9.14 M, abbreviated as X-SBR-DMI) was used as the terminating reagent.

Examples 7 and 8 yielded polymers having following properties, as seen in Table 2:

TABLE 2

Polymer Properties of Example No. 5.

| Example | M$_n$ (g/mol) | PDI | % 1,2-Bd | T$_g$ (° C.) | ML + 4 |
|---|---|---|---|---|---|
| 7 | 129951 | 1.286 | 50.0 | −23.3 | 25.8 |
| 8 | 85757 | 1.325 | 49.7 | −22.2 | 28.2 |

Examples 9-10

Synthesis of Poly(styrene-co-butadiene) with n-BuLi

The preparation and the procedures used in Example 8-9 were repeated for Examples 9 and 10, except that n-BuLi (1.68 M in hexane) was used as an anionic polymerization initiator instead of the initiator prepared in Example 2. The polymers of Examples 9 and 10 have the following properties, as seen in Table 3. These examples are used as comparative examples.

TABLE 3

Polymer Properties of Example No. 6.

| Example | M$_n$ (g/mol) | PDI | % 1,2-Bd | T$_g$ (° C.) | ML + 4 |
|---|---|---|---|---|---|
| 9 | 125929 | 1.06 | 48.1 | −24.1 | 14.4 |
| 10 | 109765 | 1.07 | 48.0 | −25.2 | 14.9 |

TABLE 4

Silica/Carbon Black Formulation

| | Generic Formulation, phr |
|---|---|
| MASTERBATCH | |
| Polymer | 100 |
| Silica | 30 |
| Carbon Black | 35 |
| Antiozonant | 0.95 |
| Stearic Acid | 1.5 |
| LVA Oil | 10 |
| REMILL | |
| 60% Si75 on carrier | 4.57 |
| FINAL | |
| ZnO | 2.5 |
| Sulfur | 1.7 |
| Accelerators | 2.0 |
| PVI | 0.25 |
| Total (phr) | 188.47 |

Examples 11-14: The SBR polymers prepared according to Examples 7-10 were utilized to prepare compounded rubber compositions that contained a mixture of silica and carbon black as the fillers, and the additional components shown in Table 4 above. Examples 11-12 are examples in accordance with the invention and Examples 13-14 are comparative examples. Specifically, Example 11 represents a compounded rubber composition containing the polymer of Example 7, prepared without a terminator; Example 12 represents a compounded rubber composition containing the polymer of Example 8, prepared with a terminator; Comparative Example 13 represents a compounded rubber composition containing the polymer of Example 9, prepared without a terminator; and Comparative Example 14 represents a compounded rubber composition containing the polymer of Example 10, prepared with a terminator. The results of the physical testing of Examples 11-14 are presented in Table 5.

TABLE 5

Si/CB rubber compositions

| | Example | | | |
|---|---|---|---|---|
| | 11 | 12 | 13 | 14 |
| Polymer type: | Si/H | Si/DMI | nBu/H | n-Bu/DMI |
| Initiator. | "Si"—Li | "Si"—Li | n-BuLi | n-BuLi |
| Terminator: | IPA | DMI | IPA | DMI |
| $M_n$ | 129951 | 85757 | 125929 | 109765 |
| $M_w/M_n$ | 1.28 | 1.32 | 1.06 | 1.07 |
| % Coupling $ML_{1+4}$ @ 100° C.: | 25.8 | 28.2 | 14.4 | 14.9 |
| $T_g$, (° C.): | −23.3 | −22.2 | −24.1 | −25.2 |
| Surfanalyzer D.I.: | 76.4 | 66.2 | 70.6 | 55.2 |
| 171° C. MDR $t_{50}$ (min): | 6.56 | 4.55 | 6.88 | 4.78 |
| 171° C. MH-ML (Kg-cm): | 22.61 | 18.51 | 24.03 | 19.13 |
| $ML_{1+4}$ @ 130° C.: | 78.7 | 125.2 | 60.1 | 95.6 |
| 300% Modulus @ 23° C. (MPa) | 11.6 | 13.4 | 11.1 | 13.0 |
| Tensile Strength @ 23° C. (MPa) | 14.4 | 14.2 | 13.7 | 14.8 |
| Temp Sweep 0° C. tan δ | 0.3304 | 0.3987 | 0.3206 | 0.3773 |
| Temp Sweep 50° C. tan δ | 0.2294 | 0.1987 | 0.2481 | 0.1965 |
| RDA 0.25-14% ΔG' (MPa) | 5.950 | 2.278 | 6.142 | 2.380 |
| 50% C RDA Strain sweep (5% strain) tan δ | 0.2303 | 0.1585 | 0.2399 | 0.1683 |
| Bound rubber (%) | 12.8 | 37.6 | 19.0 | 41.1 |
| 50° C. Dynastat tan δ | 0.2230 | 0.1527 | 0.2307 | 0.1693 |

As can be seen from the Table 5, Example 11 exhibits improved properties as compared to Comparative Example 13 and Example 12 exhibits improved properties as compared to Comparative Example 14. In particular, the RDA strain sweep tan δ is lower for Examples 11 and 12, meaning that the compounded rubber has a lower hysterises and improved rolling resistance. The ΔG', a measure of the Payne effect, is lower for Examples 11 and 12, indicating that the functional chain ends are interacting better with the fillers. The temperature sweep 0° C. tan δ, is increased for Examples 11 and 13, demonstrating an improvement in wet traction.

The foregoing description of embodiments is provided to enable any person skilled in the art to make or use embodiments of the present invention. Various modifications to these embodiments are possible, and the generic principles presented herein may be applied to other embodiments as well. As such, the present invention is not intended to be limited to the embodiments shown above but rather is to be accorded the widest scope consistent with the principles and novel features disclosed in any fashion herein.

What is claimed is:

1. A process for producing a siloxy-functionalized polymer comprising:
   (a) providing a siloxy-containing compound;
   (b) metallating the siloxy-containing compound to produce a metallated siloxy-containing compound; and
   (c) polymerizing anionically polymerizable monomer in the presence of the metallated siloxy-containing compound, thereby producing a polymer including a siloxy group, where the silicon atom of the siloxy group is tethered to the polymer through a silicon-carbon bond.

2. The process of claim 1, wherein the alkoxysilyl-containing compound comprises an alkoxysilane or a dialkoxysilane.

3. The process of claim 2, wherein the alkoxysilyl-containing compound contains at least one alkyl group and at least one hydrocarbon substituent that contains no α-protons on the carbon atom directly bonded to the silicon atom.

4. The process of claim 3, wherein the alkyl group comprises a methyl group and the substituent comprises t-butyl, phenyl, or derivative thereof.

5. The process of claim 1, wherein the anionically polymerizable monomer comprise a conjugated diene.

6. The process of claim 5, wherein the conjugated diene is selected from the group consisting of 1,3-butadiene, isoprene, 1,3-pentadiene, 2,3-dimethyl-1, 3-butadiene, and myrcene.

7. The process of claim 6, wherein the anionically polymerizable monomer further includes additional monomer selected from the group consisting of styrene, α-methyl styrene, p-methylstyrene, and vinylnaphthalene.

8. The process of claim 1, wherein the metallation step is performed via lithiation.

9. A process for producing a alkoxysilyl-functionalized polymer, the process comprising:
   initiating the polymerization of anionic polymerizable monomer with a metallated siloxy-containing compound represented by Formula I

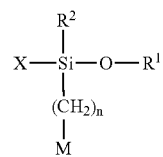

wherein

M represents a metal;

n represents an integer ranging from 1 to 3;

X represents a hydrocarbyl that contains no α-protons on the carbon atom directly bonded to the silicon atom $R^1$ represents an alkyl group, and $R^2$ represents an alkyl group or alkoxy group, wherein $R^1$ and $R^2$ may together from a cyclic structure.

10. The process of claim 9, wherein for the metallated alkoxysilyl-containing compound, M represents a lithium atom; n represents 1; $R^2$ represents a methyl group; and X represents a t-butyl group, a phenyl group, or derivative thereof.

11. The process of claim 9, wherein the polymer is a rubbery polymer.

12. The process of claim 11, wherein the rubber polymer is a butadiene-styrene polymer.

13. The process of claim 9, where said anionically polymerizable monomer includes conjugated diene monomer.

14. The process of claim 13, where said anionically polymerizable monomer further includes monovinyl aromatic monomer.

15. The process of claim 9, where the polymerization is carried out in an organic solvent.

16. The process of claim 15, where the organic solvent includes an aliphatic hydrocarbon solvent.

17. The process of claim 9, where the polymerization produces a alkoxysilyl-functionalized polymer within a polymerization mixture, and further comprising the step of reacting the siloxy-functionalized polymer with a protic terminating reagent.

18. The process of claim 9, where the polymerization produces a alkoxysilyl-functionalized polymer within a polymerization mixture, and further comprising the step of reacting the siloxy-functionalized polymer with a functional terminating reagent.

19. The process of claim 18, further comprising the step of isolating the alkoxysilyl-functionalized polymer from the polymerization mixture.

20. The process of claim 17, further comprising the step of isolating the alkoxysilyl-functionalized polymer from the polymerization mixture.

21. The process of claim 1, where the alkoxysilyl-containing compound is selected from the group consisting of t-butyldimethyl-propoxy-silane, dimethyl-phenyl-propoxy-silane, and 2-t-butyl-2,5,5-trimethyl-1,3,2-dioxasilinane.

22. The process of claim 1, wherein the metallated siloxy-containing compound is represented by Formula I

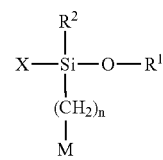

wherein

M represents a metal;

n represents an integer ranging from 1 to 3;

X represents a hydrocarbyl that contains no α-protons on the carbon atom directly bonded to the silicon atom $R^1$ represents an alkyl group, and $R^2$ represents an alkyl group or alkoxy group, wherein $R^1$ and $R^2$ may together from a cyclic structure.

23. The process of claim 9, where n is 1.

* * * * *

UNITED STATES PATENT AND TRADEMARK OFFICE
CERTIFICATE OF CORRECTION

PATENT NO. : 7,335,712 B2
APPLICATION NO. : 11/111615
DATED : February 26, 2008
INVENTOR(S) : Yuan-Yong Yan et al.

It is certified that error appears in the above-identified patent and that said Letters Patent is hereby corrected as shown below:

Col. 13, line 25;
Please correct Claim 18, line 4 to by deleting "siloxy-funtionalized" and inserting --alkoxysilyl-functionalized--.

Signed and Sealed this

Fifth Day of August, 2008

JON W. DUDAS
*Director of the United States Patent and Trademark Office*